Jan. 2, 1940.  J. J. JANCA  2,185,375
MOTOR SUPPORT
Filed July 29, 1937
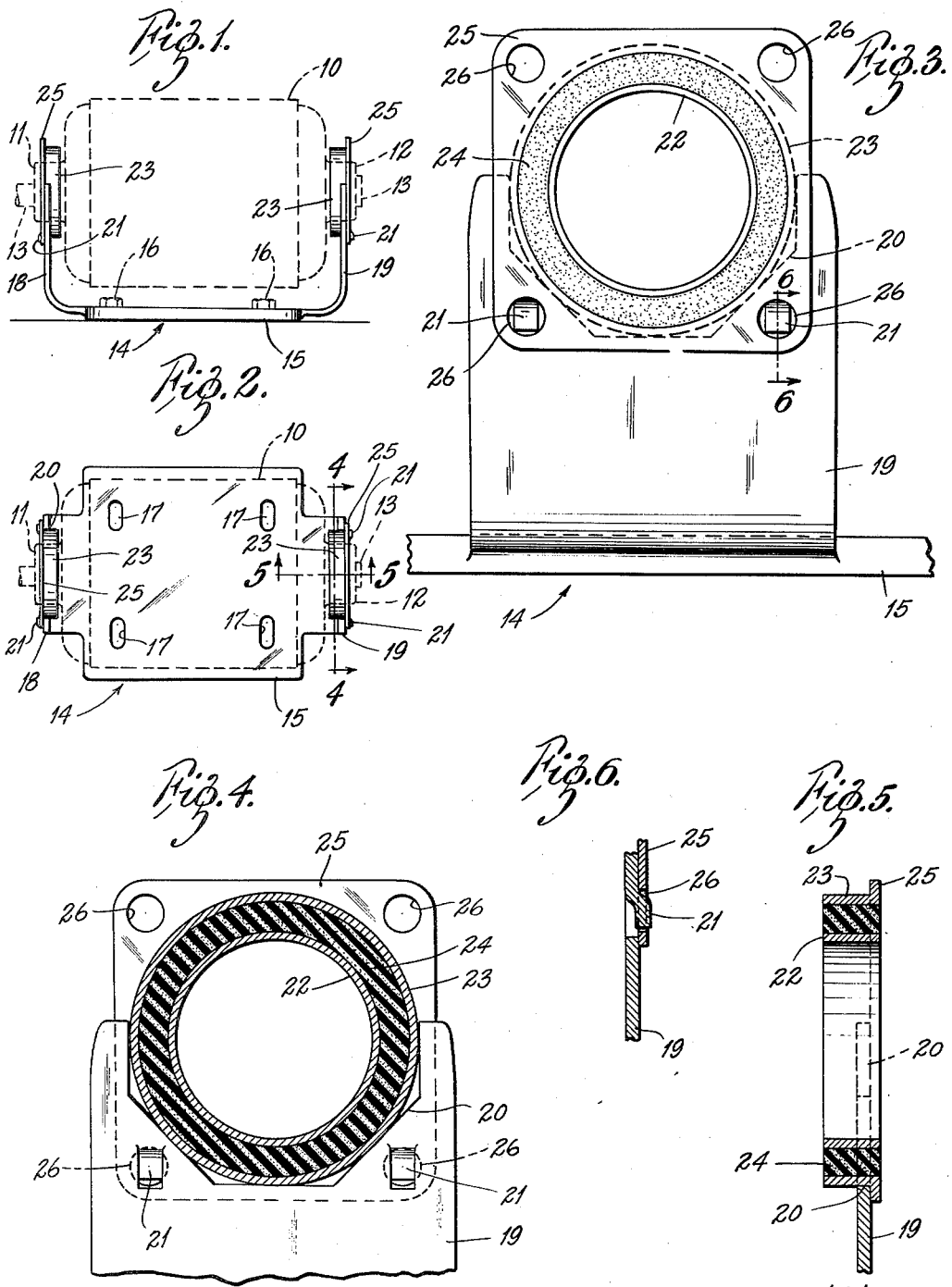
INVENTOR:
JOSEPH J. JANCA,
By Lawrence C. Kingsland
ATTORNEY.

Patented Jan. 2, 1940

2,185,375

UNITED STATES PATENT OFFICE 2,185,375

MOTOR SUPPORT

Joseph J. Janca, St. Louis, Mo., assignor to The Emerson Electric Mfg. Co., St. Louis, Mo., a corporation of Missouri Application July 29, 1937, Serial No. 156,348

8 Claims. (Cl. 248—26)

The present invention relates to a motor support, and in particular to one providing a resilient mounting for an electric motor, or the like, involving a minimum number of parts and a maximum facility of assembly.

The invention in brief consists of a base member having resilient upstanding ends into which the outer rings of a resilient motor bearing are cradled and latched.

It is an object of the invention to provide such a motor support wherein the resilient ends may readily be snapped over parts of the motor hubs and latched into position.

It is a further object of the invention to provide a motor support wherein means are employed flexibly to mount the motor and involving unbroken annular rings with resilient shock absorbing material, such as rubber, and which rings are adapted to latch into the upstanding elements of the base.

In the drawing:

Fig. 1 is an elevation of the motor support, the motor being shown in dotted lines;

Fig. 2 is a plan view of the support;

Fig. 3 is an end view with the motor removed;

Fig. 4 is a vertical section on the line 4—4 of Fig. 2;

Fig. 5 is a vertical section on the line 5—5 of Fig. 2; and

Fig. 6 is a vertical section on the line 6—6 of Fig. 3.

The motor is shown at 10 and includes the usual hub members 11 and 12 with a rotor shaft 13.

The base member is generally indicated at 14 and includes a flat section 15 adapted to be rested upon a suitable foundation and bolted thereto if desired by bolts 16. Holes 17 in the portion 15 receive the bolts.

From the opposite ends of the portion 15 extend upwardly the supports 18 and 19 that are made of such material as to be slightly resilient so that they may be moved toward or away from each other, but will resiliently return to their normal vertical positions.

Each end member is provided with a cradle 20 that may be of any suitable shape, such as semi-octagonal. Each end member likewise has stamped out therefrom lugs 21 for a purpose to be described.

Around the two motor hubs are tightly secured inner rings 22. Concentrically arranged with these inner rings are flanged outer rings 23. Between each ring 22 and 23 is located a pad of resilient material 24, this material preferably being live rubber. The flanges of the rings 23 are designated at 25.

Within the flanges 25 are located a series of openings 26 that are spaced apart the same distance as that between the two stamped out lugs 21 on the standards 18 and 19. Four holes 26 are provided, although ordinarily two are sufficient. In use, the resilient ring mountings consisting of the inner ring 22, the outer ring 23, and the padding 24, are put in position over the motor hubs, the flanges 25 being away from the motor. The rings 22 tightly engage the hubs 11 and 12 of the motor. The motor is then set down between the standards 18 and 19 of the base member 14, the standards being adapted to fit closely behind the two flanges 25. The motor will be lowered between the two standards until the outer rings 23 are cradled within the cradles 20 on the standards. The flanges 25 will pass over the lugs 21 and, in so doing, will displace the standards 18 and 19 inwardly, which is permitted by the inherent resiliency of the said standards. The holes 26 will then come opposite the lugs 21, whereupon the said lugs will be snapped outwardly by the resiliency of the standards to engage in the holes.

With this arrangement, the vibrations from the motor are, to a large degree, absorbed by the rubber 24. The motor is tightly held because the standards 18 and 19 fit snugly back of the flanges 25 and, if desired, may exert some outward pressure against these flanges, such pressure insuring a lack of noise between the contacting elements. The weight of the motor holds it in the cradles 20 and it is prevented from being withdrawn therefrom by the action of the lugs 21 within the holes 26. However, when it is desired to remove the motor, such may easily be done by flexing the standards 18 and 19 inwardly so that the lugs 21 will be clear of the holes 26.

It will be seen that the foregoing motor support is adapted for quick assembly and disassembly. It further is inexpensive and permits the use of solid and not split ring resilient mountings.

In the event that the motor is mounted on a wall, a pair of holes 26 on the side of the flange 25 may be employed. In this case the motor may partly be supported by the lugs 21. The motor may also be suspended from the ceiling, in which case the two top holes 26 are used; and the motor is then supported entirely by the lugs 21, and prevented from lifting by the cradle 20.

Consequently, in the appended claims, it is understood that the phraseology is intended to cover mounting the motor either on the floor, wall, or ceiling.

What is claimed is:

1. In a motor mounting, a pair of spaced, resilient standards, an open-ended cradle on each of the standards, to receive and support the hubs of a motor, and snap-acting means operable by displacement of the standards to hold the motor in place within the cradles.

2. In a motor mounting, means to support one end of a motor, a resilient standard adjacent the other end, a flanged member on the motor, the flange being adapted to lie alongside the standard, and snap-acting means engaging between the resilient standard and the flange to hold the motor in place, said means being rendered operative by deflection of the standard.

3. In a motor mounting, means to support one end of a motor, a resilient standard adjacent the other end of the motor, said standard having means to support its end of the motor, said motor and standard, when in operating position, having contiguous surfaces, the standard surface being urged toward the motor surface by the resiliency of the standard, and interengaging means on said two surfaces preventing withdrawal of the motor.

4. In a motor mounting, means to support one end of a motor, and a resilient standard adjacent the other end, said standard having means to receive and support a motor, said motor and standard having contiguous surfaces, one of said surfaces having a lug outstanding toward the other surface, the said other surface having a recess to receive the lug, the lug being engageable in the recess upon flexing of the standard to part the surfaces, the lug holding the motor onto the support.

5. In a motor mounting means to support one end of a motor, a resilient standard adjacent the other end, said standard having a cradle to receive the hub assembly of the motor to support that end of the motor, the hub assembly having a flange spaced from the motor and adapted to lie outside the standard, the standard having a surface lying against the flange and maintained there by the resiliency of the standard, and snap-acting means including a lug and a recess interengaging between the flange and the standard to resist removal of the motor from the standard.

6. In a motor mounting, hub assemblies on opposite ends of the motor, each assembly including a resilient ring, a rigid flanged ring surrounding the resilient ring, a pair of standards at least one of which is resiliently movable relative to the other, said standards having cut-out portions in which the hub assemblies are received, and snap-action means between each hub flange and its adjacent standard to retain the motor on the standards.

7. In a motor mounting, a base, a pair of resilient standards upstanding from the base and adapted to be resistingly moved toward and from each other, each standard having a cradle to receive one hub assembly of the motor and to hold the same against movement in three directions, a hub assembly on each end of the motor, each including a ring around the motor hub, an outer flanged ring, and resilient padding between said rings, the flanges being adapted to lie outside and against the standards with the ring cradled in the same, a pair of lugs struck out from each standard, and a pair of holes in each flange, the said lugs being snapped into the holes by displacement of the standards, and being adapted removably to prevent withdrawal of the motor from the free side of the standards.

8. In a motor mounting, a base, a pair of standards on the base, means supporting one end of the motor on one standard, the other standard having a hub-receiving cradle open at one end, the hub of the corresponding end of the motor having therearound a resilient pad, a rigid member surrounding said pad and adapted to enter the open end and rest in the cradle on the standard, the rigid member having a flange extending from the cradle contiguous to a surface of the standard, and readily separable interengaging means between the flange and said surface to prevent withdrawal of the hub from the cradle.

JOSEPH J. JANCA.